A. O. SHRADER.
DIFFERENTIAL LOCKING GEARING.
APPLICATION FILED JAN. 29, 1913.
1,108,800.
Patented Aug. 25, 1914.
2 SHEETS—SHEET 1.
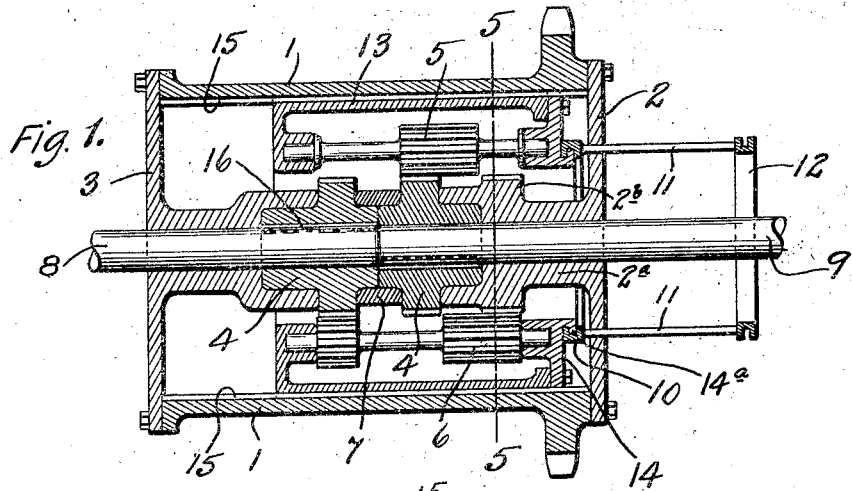
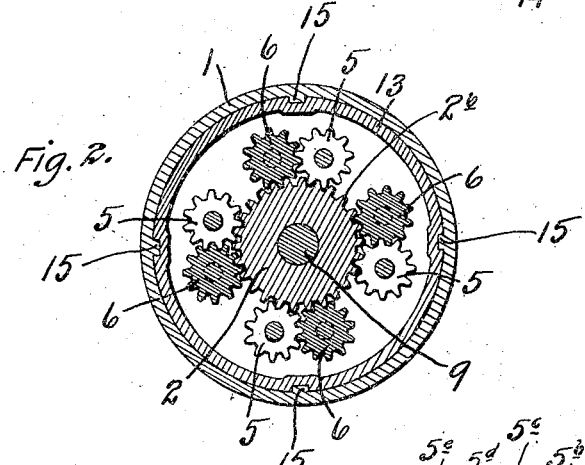
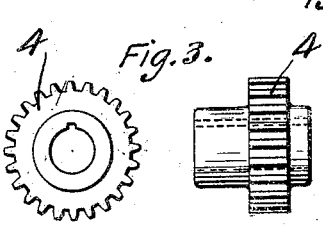
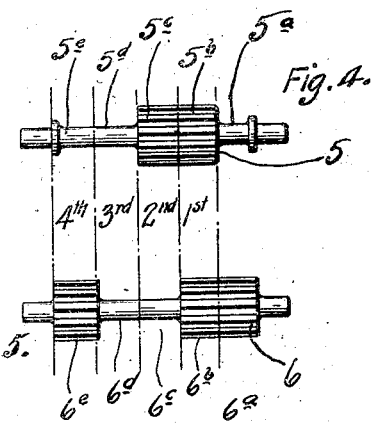
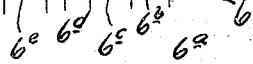
Witnesses
Wm Janus.
W. T. Smith
Inventor
Andrew O. Shrader
By T. K. Cornwall, Att'y.

A. O. SHRADER.
DIFFERENTIAL LOCKING GEARING.
APPLICATION FILED JAN. 29, 1913.
1,108,800.
Patented Aug. 25, 1914.
2 SHEETS—SHEET 2.
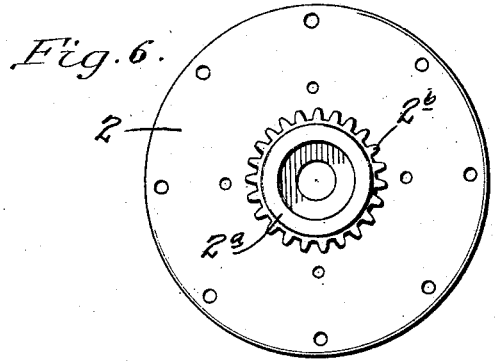
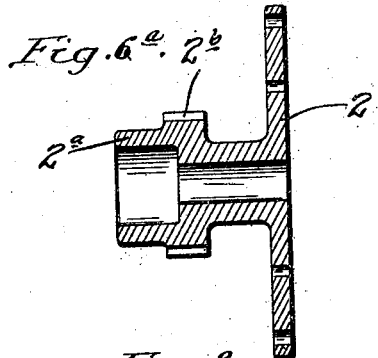
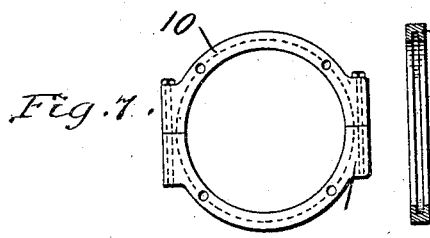
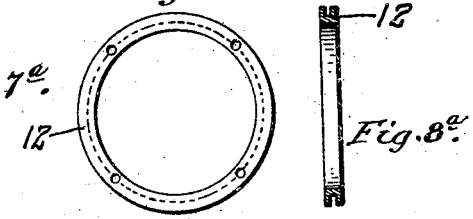
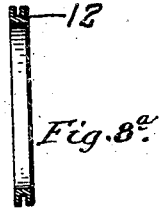
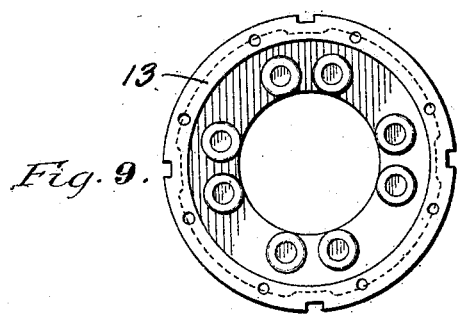
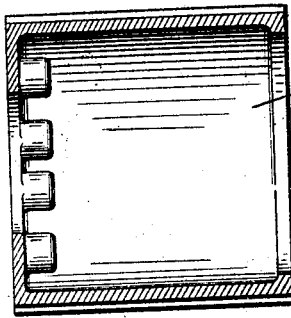
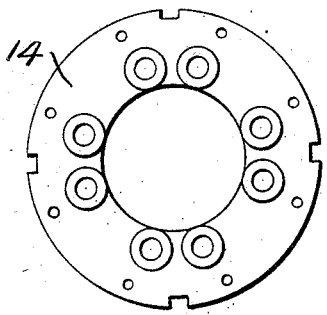
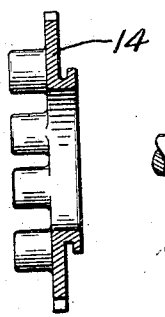
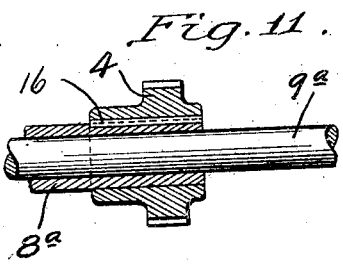
Witnesses
Wm Janus
W. O. Smith
Inventor
Andrew O. Shrader
By F. K. Cornwall, Atty

UNITED STATES PATENT OFFICE.

ANDREW O. SHRADER, OF ST. LOUIS, MISSOURI.

DIFFERENTIAL LOCKING-GEARING.

1,108,800.  Specification of Letters Patent. Patented Aug. 25, 1914.

Application filed January 29, 1913. Serial No. 744,871.

*To all whom it may concern:*

Be it known that I, ANDREW O. SHRADER, a citizen of the United States, residing at the city of St. Louis, State of Missouri, have invented a certain new and useful Improvement in Differential Locking-Gearing, of which the following is a full, clear, and exact description, such as will enable others skilled in the art to which it appertains to make and use the same, reference being had to the accompanying drawings, forming part of this specification, in which—

Figure 1 is a view in which the parts are in such position that both the parts are locked in driving relation to the motive power. Fig. 2 is a sectional view on line 5—5 of Fig. 1. Fig. 3 is a detail view of one of the transmission gears. Fig. 4 is a detail view of one of the sliding gears. Fig. 5 is a detail view of another of the sliding gears. Fig. 6 is an end elevation of another of the transmission gears. Fig. 6ª is a sectional elevation of the same. Fig. 7 is a detail view of one of the clutch members. Fig. 7ª is a sectional elevation of the same. Fig. 8 is a detail view of another of the clutch members. Fig. 8ª is a sectional elevation of the same. Fig. 9 is an end elevation of the sliding gear housing. Fig. 9ª is a sectional elevation of the same. Fig. 10 is an end elevation of the sliding gear housing head. Fig. 10ª is a sectional elevation of the same. Fig. 11 is a detail view of a modified form of shaft arrangement.

This invention relates to improvements in differentially locking gearing and is designed particularly for use in the transmission of all of the power to either driving wheel when it is desired to turn short, or both wheels may be differentially driven, or both wheels may be locked to the motive power.

My invention is particularly applicable to transmission gearing for vehicles operating on wet or slippery surfaces and will prevent skidding of the vehicle. It is designed particularly for use in connection with tractors, traction cultivators, automobiles, grading and ditching machines, traction engines, and other power propelled vehicles.

In the drawings, 1 indicates a driving member in the form of a cylindrical shell or housing having a gear or sprocket wheel 1ª fixed thereon and which is geared to the motive power in suitable manner not shown. 2 is one of the head pieces of the shell secured thereto in some suitable manner and having a hub portion 2ª to which is connected a toothed flange 2ᵇ constituting a retaining member which is fixed relative to the outside shell or housing. 3 is the other head piece of the outside shell and also provided with a hub portion and having an inwardly extending flange. The hub portions of these two head pieces form elongated bearings for the shafts or axles 8 and 9 divided at the center of the housing whereby either may be rotated independently of the other; or, if desired, a solid shaft 9ª (see Fig. 11) may extend entirely through the shell or housing and have mounted thereon a sleeve 8ª. One of the driving wheels is mounted on the end (right hand end) of shaft 9 or 9ª and the other driving wheel is mounted on the end (left hand end) of shaft 8 or of sleeve 8ª.

4 indicates gears or pinions keyed to the inner ends of the shafts 8 or 9, or where a sleeve 8ª is employed, one of said pinions is keyed to the shaft 8ª, as shown in Fig. 11. These pinions are provided with elongated hub portions constituting an elongated bearing for the locking keys 16 by which they are secured to their respective shafts or shaft and sleeve. The spacing collar 7 is preferably arranged between the pinions and, if desired, ball bearings or anti-friction devices may be provided between the pinions, or between the pinions and spacing collar to reduce the friction of the end thrusts.

5 and 6 are sliding transmission pinions mounted in bearings in the head pieces of a transmission member in the form of an internal shell or housing, 13 having elongated grooves in its periphery which coöperate with keys or ribs 15 extending from the inner face of the outside shell or housing 1. Preferably the head 14 of this interior shell is made removable for obvious reasons, being secured in position by suitable attaching means, not shown, while the opposite head carrying the bearings for the pinions 5 and 6 may be formed integral with the interior shell 13.

10 is a shifting collar preferably made in two pieces (see Fig. 7) suitably bolted together when in position and coöperating with an annular flange 14ª on the interior shell head 14. This shifting collar is connected by suitable rods 11 to the exteriorly arranged shifting collar 12, the latter being designed to coöperate with a forked or bifurcated end of a shifting lever, not shown. This shifting lever may coöperate with a notched segment and be locked in one of four different positions for purposes hereinafter described.

In Figs. 4 and 5, I have shown diagrammatically the first, second, third and fourth positions of the shifting pinions 5 and 6 as controlled by the shifting lever connected to the shifting collar 12 and through rods 11 to the interior shell. Remembering that power applied to the outside casing will drive the inside casing or shell and that the pinions 5 and 6 are geared or locked together at the point marked $5^b$ and $6^b$ (Figs. 4 and 5), said sliding pinions 5 and 6 being arranged in couples or pairs, four of such couples or pairs being shown, or any other number of such couples or pairs could be employed, I will now describe the operation of my improved gearing having reference particularly to the first position of the parts shown in Figs. 4 and 5.

When the parts are in the first position shown in Figs. 4 and 5, it will be noted that the shifting or sliding pinions are at the extreme left, and that the right hand portion of the pinion 6, which I will designate as $6^a$, is located practically in transverse alinement with the spacing collar 7; the next adjacent portion of the pinion 6, marked $6^b$, is in mesh with one of the pinions 4 and, for convenience of designation, as this pinion is keyed to the shaft 8 (or sleeve $8^a$) I shall designate this pinion as 4—8; the next spaces $6^c$ and $6^d$ on the sliding pinion 6 have the teeth removed, while the last space or portion $6^e$, being the left hand portion of the pinion, is provided with teeth. The companion sliding pinion 5 I have divided into spaces or sections marked respectively $5^a$ (opposite $6^a$) which is blank; $5^b$ (opposite $6^b$) toothed; $5^c$ (opposite $6^c$) toothed; $5^d$ (opposite $6^d$) blank; $5^e$ (opposite $6^e$) blank. When the parts are in the first position, the portion $6^b$ and $5^b$, always in mesh, engage the pinion 4—8 and consequently as the outside shell is driven, it will carry with it inside shell in which pinions 5 and 6 are mounted and the axle 8 through the toothed spaces $5^b$ and $6^b$ will be locked to the outside shell and in this manner be positively driven by the motive power. In this position of the parts, the axle 9 is free to revolve, or rather to remain stationary and is not driven and hence, power being applied to only one driving wheel, the vehicle may be steered, the idle or stationary traction wheel being the pivot about which the positively driven traction wheel moves.

By shifting the gears 5 and 6, through the instrumentalities above mentioned, to their second position, shown in Figs. 4 and 5, it will be noted that gear 5, through space $5^c$ remains in mesh with the pinion 4—8, while space $6^b$ passes from engagement with the same pinion and space $6^a$ meshes with the pinion 4, mounted on shaft 9, and which I may designate as 4—9. When the parts are in this position, the pinions 5 and 6 remain in mesh with each other and also with their respective pinions 4. In other words, each separately drives its shaft 8 and 9. When in this position, the shafts 8 and 9 are capable of independent movement.

To illustrate the operation of the gearing when the parts are in the second position, if the wheels were lifted from the ground and the outside shell 1 held stationary, the rotation of shaft 9, say in a clockwise direction, would, through the meshed pinions 6—5 rotate the shaft 8 in anti-clockwise direction and vice versa. However, when the traction wheels are on the ground and shafts 8 and 9 are equally loaded, rotation imparted to the outside shell or casing 1 will drive both shafts 8 and 9 in the same direction because of the engagement between the pinions 5 and 6 of each pair.

As the gearing in question is designed particularly for use in connection with the rear pair of traction wheels and as it is usual to have steering apparatus for the front pair of wheels, if said front wheels are not positively driven, then the steering of the front wheels, as in taking curves, will cause the rear positively driven wheels to travel at different rates of speed: in other words, the traction wheels, say on shaft 8, if traveling on the inner side of the curve will travel a less distance than the wheel on shaft 9 moving on the larger arc or outer circle. This difference in the movement of the two wheels is compensated for by the ability of said wheels to be relatively displaced circumferentially while both of said wheels are being driven from the motive power.

When the parts are shifted to the third position it will be noted that the spaces $5^b$ and $6^b$ which is the meshing space between the two pinions 5 and 6, are both in mesh with the pinion 4—9 and pinion 4—8 is out of mesh with a toothed portion of either pinion 5 or 6. Consequently the shaft 8 is free, that is, is not driven, while the shaft 9 is locked to the outside shell or casing 1 and is positively driven. In this position of the parts, the traction wheel on the outer end of shaft 8 may be used as a pivot around which the positively driven traction wheel on the outer end of shaft 9 may be used for steering purposes.

The fourth position of the parts is that in which both axles 8 and 9 are positively locked to the outside shell or housing 1. In this position of the parts, it will be noted that the space $6^a$ is in mesh with the toothed flange $2^a$ of the outside shell head 2, and therefore pinion 6 is positively and directly driven from the outside shell. The spaces 5ᵇ and 6ᵇ are in mesh with each other and consequently neither pinion 5 nor 6 can move independently of the other. The space 5ᶜ is in mesh with the pinion 4—9 and the space 6ᶜ is in mesh with the pinion 4—8.

Briefly recapitulating the four different positions, it will be seen that the sliding pinions 5 and 6 in certain positions act as inert masses of metal serving solely as locking blocks having no independent rotary movement, but remaining stationary with respect to the driving shell or casing 1 and the part or parts which are positively driven thereby; and that in other positions, these sliding pinions have a rotary movement relative to the parts which they drive. In the first position, the left hand shaft 8 or the sleeve 8ᵃ is positively locked and positively driven, while the shaft 9 remains unlocked; in the second position, neither shaft 8 nor 9 is positively locked, but each may be driven differentially from the outside driving shell; in the third position, the right hand shaft 9 is positively locked to the outside driving shell, while the left hand shaft is free or unlocked from said shaft; and in the fourth position, both shafts 8 and 9 are positively locked to the driving shaft.

The outside shell or housing 1 is designed to act as an oil container in which a suitable lubricant may be employed whereby the several pinions and gears may run in oil.

I have not shown the packing glands or boxes which are usually employed around shafts or axles and rods 11, as these are well known in the art and need not be illustrated in detail.

What I claim is:

1. In a gearing of the character described, the combination of driven shafts carrying pinions, a housing inclosing said pinions and loosely mounted on said shafts or axles, said housing being provided with gear teeth and constituting a driving element, a member arranged to slide within said housing and to partake of the rotary movement thereof, and pinions mounted in said sliding element and in mesh with each other, said pinions having their teeth removed at certain portions in their length and capable of coöperating with the axle pinions for the purposes set forth.

2. In a gearing of the character described, the combination of driven shafts, a power driven housing provided with bearings in which said driven shafts are mounted and are free to turn, said power driven housing constituting an oil containing receptacle, an element slidable within the power driven housing and partaking of the rotary movement thereof, meshed pairs of pinions carried by said sliding element and having their teeth cut away at certain points in their length, and gears mounted on the driven shafts with which said sliding pinions coöperate, the power driven housing having gear teeth with which said pinions coöperate in certain positions.

3. A power transmission mechanism comprising the combination of driven shafts, driven pinions carried thereby, a driving member, a transmission member driven by said driving member, a pair of transmission pinions carried by said transmission member and adapted to engage said driven pinions selectively and simultaneously so as to transmit power to either or both of said driven shafts, said transmission pinions having coöperation with each other whereby differential movement may be transmitted from said driving member to said driven shafts.

4. A transmission gearing comprising the combination of driven shafts, a driving member, a pair of transmission pinions movable by said driving member, driven pinions carried by said driven shafts, and means for shifting said transmission pinions into engagement with said driven pinions selectively and collectively whereby to transmit power to said driven shafts selectively and collectively, said transmission pinions having coöperation with each other whereby differential movement may be transmitted to said driven shafts simultaneously.

5. In a transmission gearing, the combination of driven shafts, a driven pinion on each, a driving member, transmission pinions carried by said driving member and having mutual coöperative engagement, said transmission pinions being mounted for shifting movement whereby both of said transmission pinions may be engaged with either one of said driven pinions at the same time to transmit power to said driven pinion, and whereby each of said transmission pinions may be placed in engagement with one each of said driven pinions to transmit differential movement to said driven pinions, and whereby one of said transmission pinions may be moved to position wherein it is held against rotation while said transmission pinions are severally in engagement with the different driven pinions to transmit uniform movement to both of said driven pinions.

6. In a transmission gearing, the combination of driven shafts, driven pinions coöperating therewith, a driving member, transmission pinions coöperating with said driving member and driven pinions, a transmission member carrying said transmission pinions and carried by said driving member, said transmission member being shiftable longitudinally of said shafts whereby to alter the relation of said transmission pinions and said driven pinions.

7. In a transmission gearing, the combination of driven shafts, driven pinions coöperating therewith, a driving member, a transmission member carried thereby and shiftable therein relative to said driven pinions, and transmission pinions carried by said transmission member and adapted to engage said driven pinions.

8. In a transmission gearing, the combination of driven shafts, driven pinions coöperating therewith, a driving member having a retaining member, transmission pinions carried by said driving member for driving said driven pinions and having mutual coöperative engagement, and means whereby one of said transmission pinions may be moved into engagement with said retaining member to hold said transmission pinions against individual rotary movement.

9. In a transmission gearing, the combination of driven shafts, driven pinions coöperating therewith, a driving member, meshing transmission pinions carried by said driving member and adapted to transmit movement to said driven pinions, and means whereby said transmission pinions may be shifted into various relationships with said driven pinions.

10. In a transmission gearing, the combination of driven shafts, driven pinions coöperating therewith, a driving member in the form of a casing, a plurality of transmission pinions carried by said driving member for transmitting motion to said driven pinions and shiftably mounted within the driving member, and means for shifting said transmission pinions relative to said driven pinions.

11. In a transmission gearing, the combination of driven shafts, driven pinions coöperating therewith, a driving member revolubly supported on said shafts, transmission pinions for driving said driven pinions carried by said driving member and adapted to rotate within the same, and means for shifting said transmission pinions relative to said driven pinions.

In testimony whereof I hereunto affix my signature in the presence of two witnesses, this 23d day of January, 1912.

ANDREW O. SHRADER.

Witnesses:
F. R. CORNWALL,
M. P. SMITH.